US012572637B1

(12) United States Patent
Wurmfeld et al.

(10) Patent No.: US 12,572,637 B1
(45) Date of Patent: Mar. 10, 2026

(54) UNIVERSAL IDENTITY VERIFICATION FOR VIDEO CONFERENCING

(71) Applicant: Capital One Services, LLC, McLean, VA (US)

(72) Inventors: David Kelly Wurmfeld, Falls Church, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/795,828

(22) Filed: Aug. 6, 2024

(51) Int. Cl.
| | |
|---|---|
| *G06F 21/32* | (2013.01) |
| *G06F 21/36* | (2013.01) |
| *G06K 19/06* | (2006.01) |
| *H04N 7/15* | (2006.01) |

(52) U.S. Cl.
CPC ............. *G06F 21/32* (2013.01); *G06F 21/36* (2013.01); *G06K 19/06009* (2013.01); *H04N 7/15* (2013.01)

(58) Field of Classification Search
CPC ... G06F 21/32; G06F 21/36; G06K 19/06009; H04N 7/15
See application file for complete search history.

(56) References Cited

U.S. PATENT DOCUMENTS

| | | | |
|---|---|---|---|
| 2013/0176108 A1* | 7/2013 | Madhani ................. | G06F 21/32 |
| | | | 340/5.82 |
| 2019/0109711 A1* | 4/2019 | Gladwin ............... | H04L 9/0869 |

| | | | |
|---|---|---|---|
| 2019/0361694 A1* | 11/2019 | Gordon ................... | G06F 9/452 |
| 2022/0014509 A1* | 1/2022 | Walters ................... | H04L 63/20 |
| 2022/0046415 A1* | 2/2022 | Chiang ............... | H04L 63/0853 |
| 2022/0239655 A1* | 7/2022 | Viswanathan ........ | H04L 63/105 |
| 2022/0377057 A1* | 11/2022 | Lyons ................... | H04L 63/045 |
| 2023/0100264 A1* | 3/2023 | Baker ................... | B60R 25/241 |
| | | | 340/439 |

(Continued)

OTHER PUBLICATIONS

"Please give me more options to scan a QR code when adding an OTP." Website: https://www.ftsafe.com/Products/OTP/qr_code_token; copyright 2023; date accessed: Aug. 5, 2024; 1Password.

(Continued)

*Primary Examiner* — J. Brant Murphy
(74) *Attorney, Agent, or Firm* — Banner & Witcoff, Ltd.

(57) ABSTRACT

Systems, methods, and apparatuses are described for verifying a user identity in a video conference. A computing device may receive user data and a plurality of security parameters associated with accessing a video conference based on a confidentiality level of the video conference. The computing device may generate a security code that is encoded with user data. The computing device might cause the security code to be displayed on the mobile device for a predetermined time period. The computing device may receive an indication that the first device scanned the security code by using a camera. To verify the identity of a user, the computing device may decode the security code, compare the decoded user data of the decoded security code and expected user data associated with the video conference. The computing device may determine the authenticity of a user video and allow access to the video conference.

20 Claims, 5 Drawing Sheets

300

(56) References Cited

U.S. PATENT DOCUMENTS

2023/0403274 A1 * 12/2023 Soppet ................... H04L 63/18

OTHER PUBLICATIONS

"2FA QR Code Generator; Save your 2FA secrets, then use this to scan them again." Website: https://stefansundin.github.io/2fa-qr/; Stefan Sundin. Date accessed: Aug. 5, 2024.

"How to create a dynamic QR code which changes automatically after each scan or after an interval." Website: https://community.thunkable.com/t/how-to-create-a-dynamic-qr-code-which-changes-automatically-after-each-scan-or-after-an-interval/2608584/7; Sep. 2023. Thunkable. date accessed: Aug. 5, 2024.

"Is the QR code scanning option to log in the new updated Steam app actually secure?" Website: https://www.reddit.com/r/Steam/comments/y2k8vu/is_the_qr_code_scanning_option_to_log_in_in_the/?rdt=62016. Reddit 2022. Date accessed Aug. 5, 2024.

"[question] PAM module for QR Code via webcam (2FA/MFA)" website: https://www.reddit.com/r/archlinux/comments/kv9a3f/question_pam_module_for_qr_code_via_webcam_2famfa/. Reddit 2020. Date accessed Aug. 5, 2024.

"QR code Visual Transaction Signing The perfect substitution for Authenticator Mobile App." website: https://www.ftsafe.com/Products/OTP/qr_code_token. Feitian Technologies Co., Ltd., copyright 2024. Date accessed: Aug. 5, 2024.

* cited by examiner

300

320
Geolocation Data, Biometric Data, Employment Status, Time Information, Image Data, a Background Color, or Audio Data

310

315

305

325
Verification Server

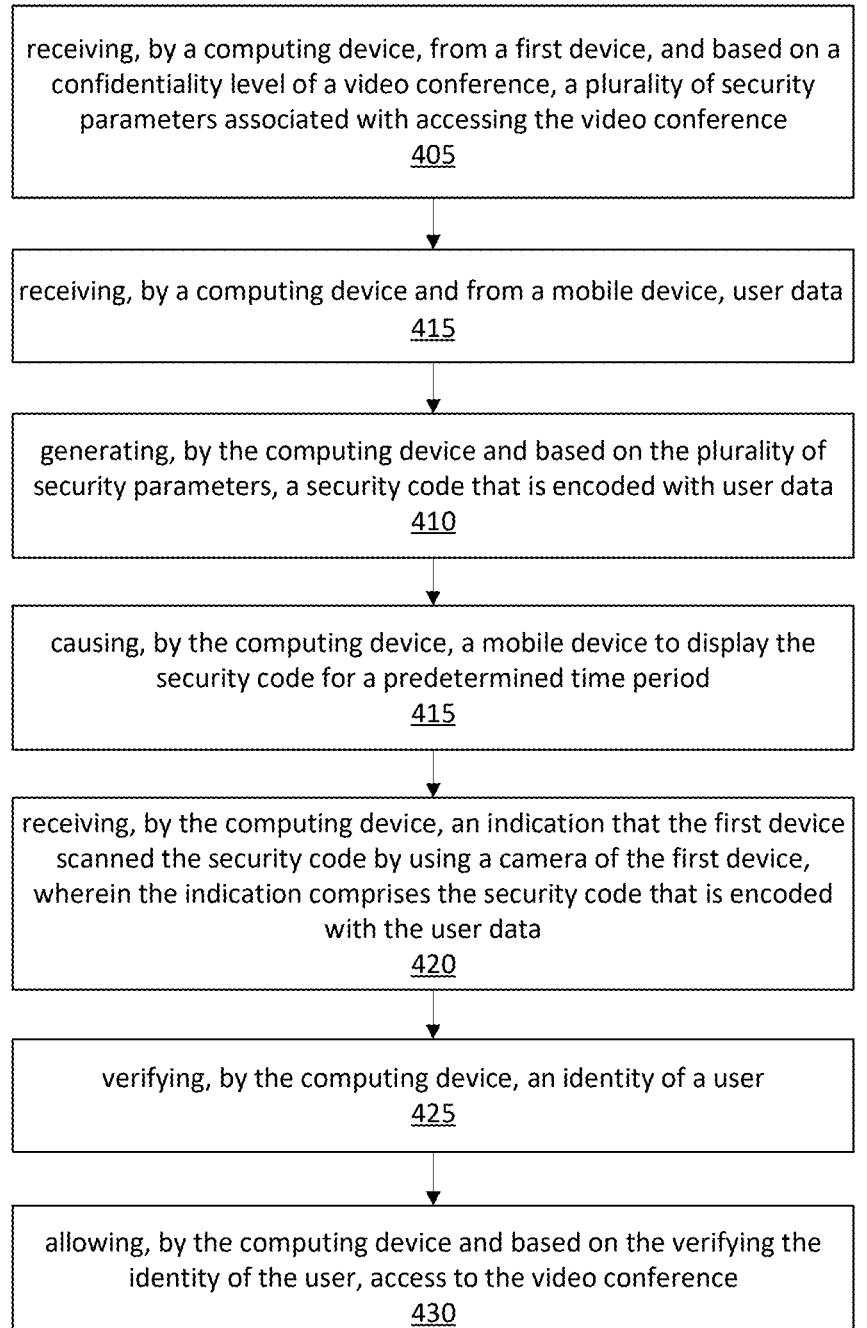

receiving, by a computing device, from a first device, and based on a confidentiality level of a video conference, a plurality of security parameters associated with accessing the video conference
405 receiving, by a computing device and from a mobile device, user data
415 generating, by the computing device and based on the plurality of security parameters, a security code that is encoded with user data
410 causing, by the computing device, a mobile device to display the security code for a predetermined time period
415 receiving, by the computing device, an indication that the first device scanned the security code by using a camera of the first device, wherein the indication comprises the security code that is encoded with the user data
420 verifying, by the computing device, an identity of a user
425 allowing, by the computing device and based on the verifying the identity of the user, access to the video conference
430

FIG. 4

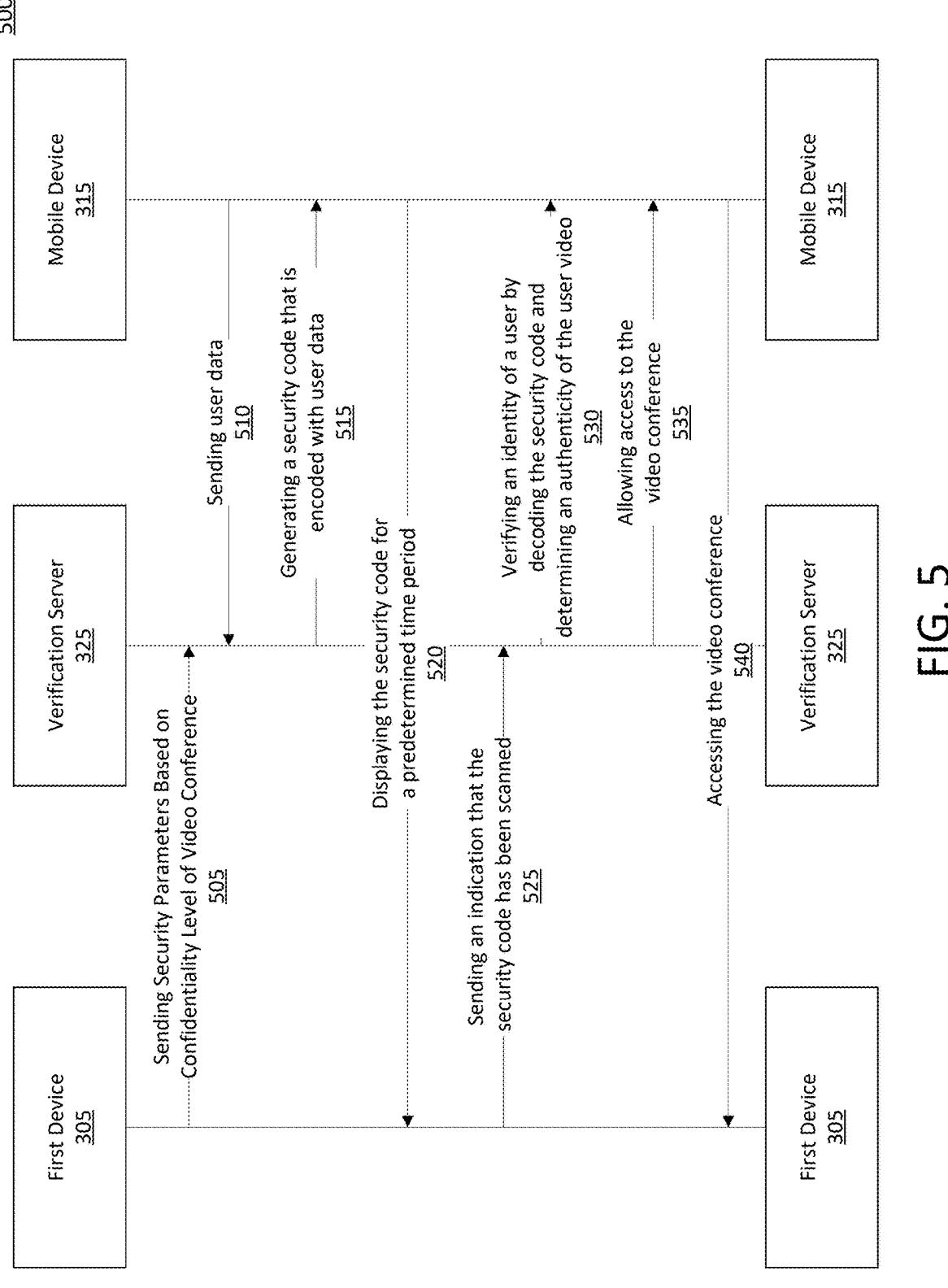

500

First Device 305    Verification Server 325    Mobile Device 315

Sending Security Parameters Based on Confidentiality Level of Video Conference 505

Sending user data 510

Generating a security code that is encoded with user data 515

Displaying the security code for a predetermined time period 520

Sending an indication that the security code has been scanned 525

Verifying an identity of a user by decoding the security code and determining an authenticity of the user video 530

Allowing access to the video conference 535

Accessing the video conference 540

First Device 305    Verification Server 325    Mobile Device 315

FIG. 5

UNIVERSAL IDENTITY VERIFICATION FOR VIDEO CONFERENCING

FIELD OF USE

Aspects of the disclosure relate generally to verifying a user identity in a video conference. More particularly, aspects described herein describe a process for verifying a user identity and the authenticity of a user video for a video conference using a security code displayed on a mobile device.

BACKGROUND

Video conferencing platforms, such as the ZOOM video conferencing platform developed by Zoom Video Communications, Inc. of San Jose, California, the FACETIME video conferencing platform developed by Apple Inc. of Cupertino, CA, and Microsoft Teams video conference platform developed by Microsoft Corporation of Redmond, WA, rely on a suite of common security measures to safeguard video conferences against unauthorized access and spoofing attempts by malicious entities, whether human hackers or automated systems. These measures include robust authentication mechanisms such as passwords and two-factor authentication (2FA), which require participants to provide additional verification beyond just a password, enhancing the overall access control. End-to-end encryption ensures that communication between participants remains secure and inaccessible to unauthorized third parties, mitigating the risk of interception and eavesdropping. Unique meeting IDs and virtual waiting rooms further bolster security by providing distinct identifiers for each session and allowing hosts to vet attendees before granting access to the main conference.

Despite the implementation of robust security measures, video conferencing platforms remain vulnerable to spoof attacks due to persistent challenges and evolving tactics employed by malicious actors. In particular, these malicious actors may exploit vulnerabilities in video conferencing systems to introduce prerecorded videos or artificial intelligence (AI) generated videos of legitimate users into conferences. They may use deepfake technology to impersonate legitimate users and create convincing replicas of individuals, making it difficult for traditional authentication methods to distinguish between real and fake participants. Facial recognition technology is commonly used to match a participant's live image against preregistered photos or biometric data. However, it can be circumvented by high-quality photos or videos of the legitimate user. Similarly, verification codes sent to email or mobile devices provide an additional layer of security, assuming the registered accounts are not compromised. Behavioral biometrics, which analyze user-specific behaviors like typing patterns or mouse movements, offer further validation. Yet, maintaining accuracy and security in behavioral analysis requires ongoing monitoring and adaptation.

There is a growing need for advanced solutions capable of real-time video analysis to detect and mitigate the presence of fake videos during conferences in addition to the general security issues. For example, social engineering tactics, such as phishing emails impersonating legitimate contacts or platform notifications, often deceive users into revealing sensitive information like login credentials or meeting IDs, bypassing strong authentication protocols like passwords and two-factor authentication (2FA). Additionally, software vulnerabilities, even with regular updates and patches, can be exploited by attackers to compromise encryption and access controls, potentially gaining unauthorized access or control over meetings. Endpoint security risks pose another threat, where compromised devices or insecure configurations may allow attackers to intercept communications or manipulate session data. Internal threats from compromised user credentials or malicious insiders further complicate security, as they may exploit their access to facilitate spoof attacks or compromise meeting security settings. The integration of third-party services through APIs introduces potential vulnerabilities if not properly secured, exposing conference data to exploitation. Human factors, including user error and lack of awareness, contribute significantly to vulnerabilities, such as sharing meeting links publicly or falling victim to phishing attempts.

As attackers continuously adapt their tactics to exploit emerging vulnerabilities, video conferencing platforms must adopt a comprehensive security approach that includes real-time detection of fake videos, user education, rigorous software testing, and proactive collaboration with cybersecurity experts to mitigate risks and maintain secure communication environments.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may address the problems discussed above and others, and may generally improve the quality, efficiency, and speed of securing video conference calls (e.g., video stream, video call, audio stream, audio call, etc.) by verifying the identity of users (e.g., video conference hosts and/or attendees) of a video conference. For example, the computing device may use a scheme of temporally synched key tokens transmitted to the attendees using a mobile app via a mobile device (e.g., smartphone). The computing device may receive security parameters associated with accessing the video conference. Security parameters may refer to the specific measures or controls put in place to safeguard the confidentiality, integrity, and availability of the video conference. The security parameters (e.g., encryption strength, access controls, monitoring) may vary depending on the confidentiality level of the video conference. The computing device may receive user data from a mobile device of the user. For example, user data may be collected automatically based on the user's geolocation data, biometric data, employment status, time information, image data, a background color, or audio data. Alternatively, user data may be collected upon receiving user permission.

The temporally synched key tokens may be converted into a visually transmitted code (e.g., a Quick-Response (QR) Code), which may be encoded with the user data and displayed on the mobile device. The visually transmitted code may be scanned by a camera associated with a device of the video conference platform. The computing device may receive an indication that the first device scanned the security code. The computing device may verify the identity of the user. For example, to verify the identity of the user, the computing device may decode the security code. The computing device may then compare the decoded user data of the decoded security code and expected user data associate with the video conference. The computing device may determine an authenticity of a user video based on the decoded user data and the security parameters.

Additionally, or alternatively, an out-of-band channel may accompany the video stream and provide an extra layer of security and verification (e.g., authentication, validation, identification, etc.). This out-of-band channel can carry encoded signals that authenticates the user (e.g., host and/or participants in the video stream). For example, an encoded audio data stream (e.g., at the Nyquist frequency below the maximum frequency with a connection) may transmit a low bandwidth code verifying the identity of the user. To further verify the authenticity of the user, the out-of-band coded signals may be used as a basis to ensure the correct response code is returned. The out-of-band coded signals may be sent and/or received through a device (e.g., mobile device, smart-phone, room audio controller, etc.), which may also be used to encode and/or decode the out-of-band coded signal.

The medium of the out-of-band signal may be sound and/or visual. For example, an audio signal may be encoded with a low-bandwidth code, such as specific tones or fre-quencies, embedded within the audio stream accompanying the video. The audio signal may be decoded to identify the user. The correct response code may be generated based on the decoded signal, verifying the authenticity of the users. In another example, a visual based out-of-band signal might be specific colored dots or patterns encoded in a particular region of the video screen. The visual signals may be captured and decoded to extract the encoded information. Similar to audio signals, the decoded visual code may verify the authenticity of the users by generating the correct response code.

By using out-of-band signals, authentication may not be solely reliant on the primary video stream, making it more resistant to spoofing or manipulation attempts. Both audio and visual signals may operate at low bandwidths, minimiz-ing the impact on the primary video transmission while still providing robust authentication.

Based on the verification, the computing device may determine whether or not the user may enter the video conference. For example, if the identity of the user is verified and the user video is determined to be authenticated, then the user may be given access to the video conference. If the identity of the user is not verified and the user video is not determined to be authenticated, then the user may not be given access to the video conference.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4 depicts a flow chart of a process for verifying the identity of a user and determining the authenticity of the user video according to one or more aspects of the disclosure; and FIG. 5 depicts an activity diagram according to one or more aspects of the disclosure.

DETAILED DESCRIPTION

Figure 1:
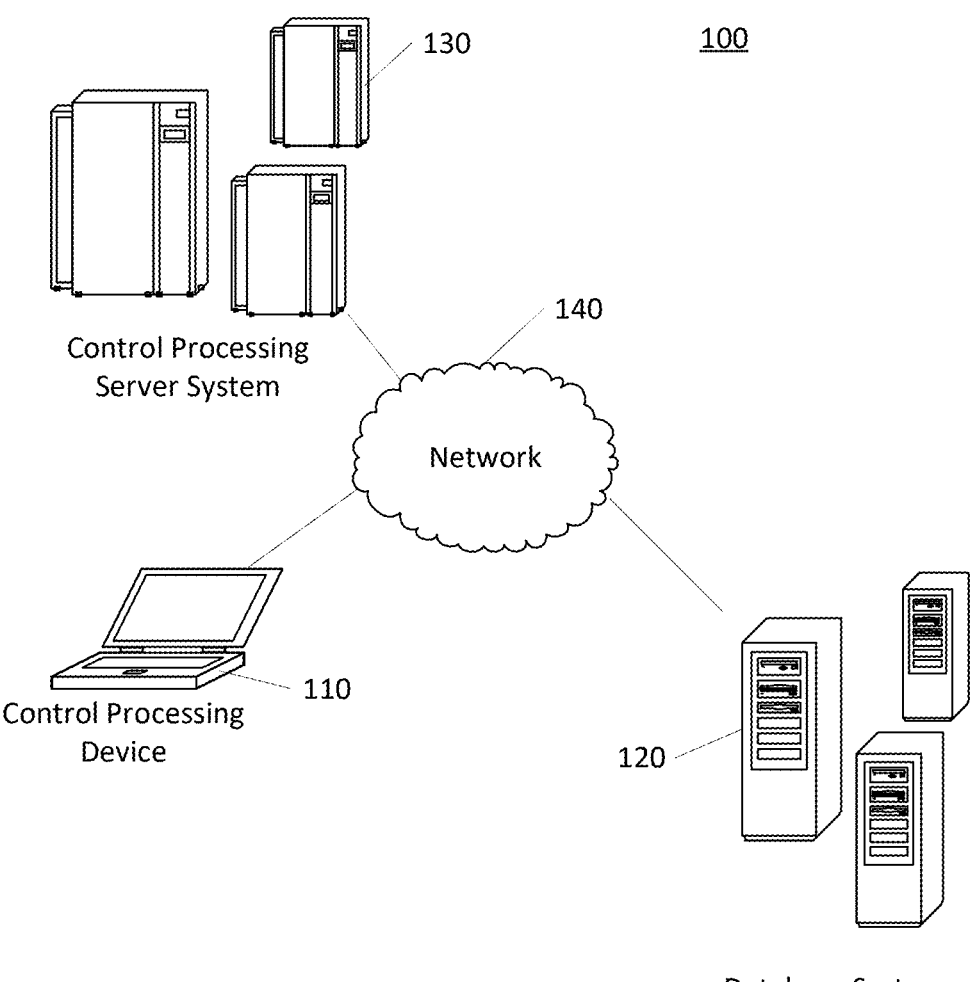
FIG. 1 depicts an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning. Also, it is to be understood that the phraseology and terminology used herein are for the purpose of descrip-tion and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for identity verification in video conferencing software. There are many challenges with identity due to the digital nature of interactions and the potential for malicious activities. Unlike traditional in-per-son verification processes that rely on physical documents, digital verification via video conferencing introduces vul-nerabilities that can be exploited by sophisticated attackers. Verification typically hinges on methods like facial recog-nition, verification codes sent to registered devices, and behavioral biometrics analysis. These measures aim to authenticate users, but they are not without their limitations.

Facial recognition technology is commonly used to match a participant's live image against preregistered photos or biometric data. However, it can be circumvented by high-quality photos or videos of the legitimate user. Similarly, verification codes sent to email or mobile devices provide an additional layer of security, assuming the registered accounts are not compromised. Behavioral biometrics, which analyze user-specific behaviors like typing patterns or mouse movements, offer further validation. Yet, maintaining accuracy and security in behavioral analysis requires ongo-ing monitoring and adaptation.

Despite these solutions, video conferencing platforms face persistent vulnerabilities. Advancements in deepfake technology enable realistic impersonations through manipu-lated videos or audios of the genuine user, undermining facial recognition systems. Account takeovers via phishing attacks or credential theft pose additional risks, allowing unauthorized access to meetings. Social engineering tactics further exploit human vulnerabilities, tricking users into divulging verification codes or other sensitive information.

Mitigating these risks involves balancing security measures with user experience and privacy concerns. Stringent verification procedures may deter legitimate users or complicate joining meetings, impacting usability. Moreover, storing biometric data or conducting detailed behavioral analysis raises privacy issues and compliance challenges with data protection regulations. Continuously updating verification methods and algorithms is crucial to stay ahead of evolving spoofing techniques and malicious actors.

Systems as described herein may include using temporally synchronized key tokens distributed to video conference attendees via a mobile app on their smartphone devices. These tokens may be used to access the video conference and may vary based on the conference's confidentiality level.

User data, gathered from mobile devices, may include geolocation, biometrics, employment status, time details, images, background colors, or audio information, either automatically or with user consent. These data points may be used to generate visually transmitted codes like QR codes, incorporating encoded user data. When scanned by the video conference platform's device camera, these codes may signal the successful transmission and subsequent verification of the user's identity.

Verification processes may involve decoding the security code and comparing the extracted user data with expected information (e.g., required credentials) associated with the video conference. The authenticity of the user's video feed may then be assessed against security parameters. Based on this verification, the computing device may determine whether to grant the user access to the video conference. Access may be permitted if the user's identity is confirmed and their video feed authenticated; otherwise, access may be denied.

This example system may represent an advancement in identity verification for video conferencing compared to conventional approaches by introducing temporally synchronized key tokens, which may be dynamically generated and synchronized with each video conference session. This system may enhance security by ensuring that access codes are valid only within specific timeframes, mitigating risks associated with static verification methods vulnerable to compromise or reuse. Moreover, the integration of a dedicated mobile app on users' smartphones may leverage the security features inherent in modern mobile devices, such as secure app environments and biometric authentication mechanisms (e.g., fingerprint or facial recognition). By utilizing mobile devices for token distribution and verification, the system may strengthen the link between participants' identities and their access credentials.

Furthermore, the system may expand beyond conventional user information by incorporating diverse data types such as geolocation, biometrics, and employment status. This comprehensive data collection may not only enhance the granularity of identity verification but also enable adaptive security measures tailored to the sensitivity and confidentiality of each video conference. Data collection processes may be automated or permission-based, ensuring flexibility and compliance with privacy regulations.

Additionally, the use of visually transmitted codes, such as QR codes, may represents a departure from traditional alphanumeric verification methods. These codes may be visually scannable by cameras associated with the video conference platform, facilitating streamlined verification while securely transmitting encoded user information. This method may reduce the risks associated with interception or manual input errors inherent in traditional verification methods.

Moreover, the system may facilitate real-time authentication and access control by decoding security codes and comparing extracted user data against predefined conference parameters. This ensures that only authenticated users with verified credentials-both in terms of identity and video authenticity—are granted access to the conference. Overall, these enhancements collectively aim to bolster security, enhance user experience, and mitigate risks associated with identity spoofing and unauthorized access in video conferencing environments.

Given the above, aspects described herein improve the functioning of computers by improving the process whereby, during a video conference, computers are able to verify the identity of users and user video streams. It is unfortunately increasingly common for malicious actors to spoof accounts and video (e.g., using so-called deepfakes). To avoid these and similar issues, aspects described herein implement a process whereby a video stream itself can be validated (along with other validation procedures) to further provide confidence that a participant in a video stream is genuine. As such, aspects described herein provide a computer-implemented solution to what is fundamentally a computer-oriented problem. No arrangement of human beings could perform such a process, as the problem is fundamentally related to computers and the steps described herein involve the use of different computers (e.g., a user's mobile device displaying a QR code) to remedy the issue.

FIG. 1 shows a system 100. The system 100 may include at least one device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Device 110 may verify and authenticate users as described herein. Database systems 120 may retrieve and store data as described herein. Databases may include, but are not limited to relational databases, hierarchical databases, distributed databases, in-memory databases, flat file databases, XML databases, NoSQL databases, graph databases, and/or a combination thereof. Server systems 130 may send and receive data associated with the user and the video conference as described herein. The network 140 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices.

Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
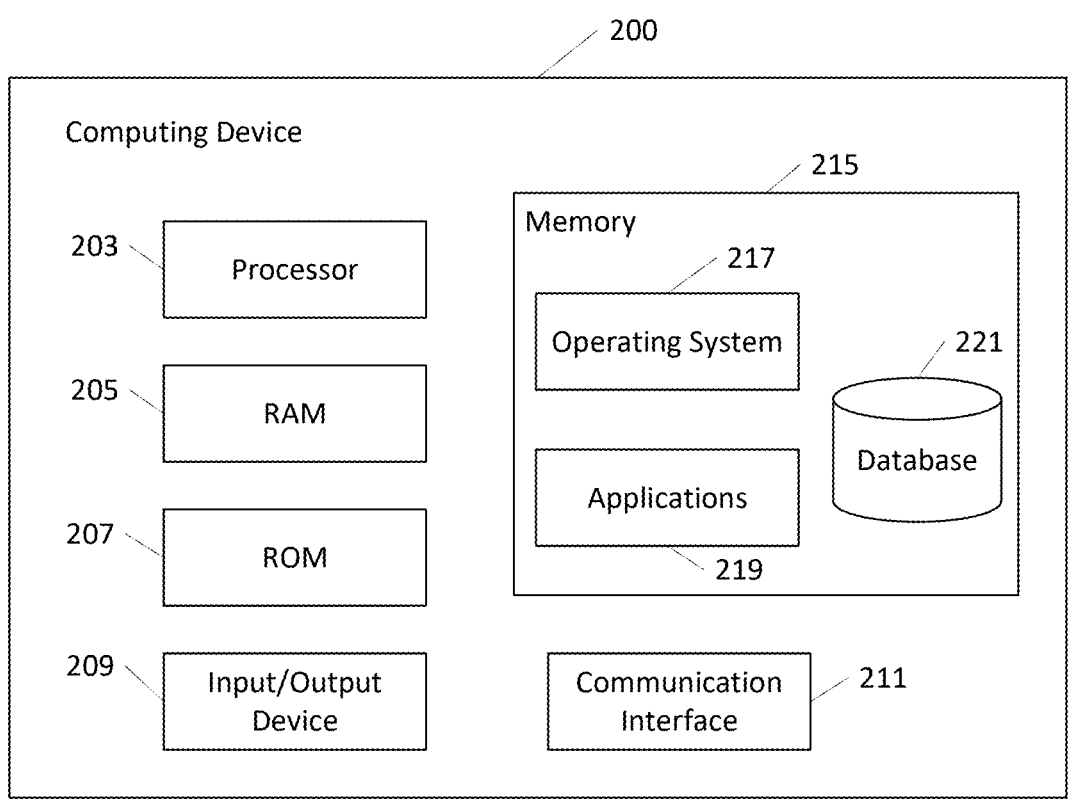
FIG. 2 depicts an example computing device in accor-dance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a room audio controller, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of speakers for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
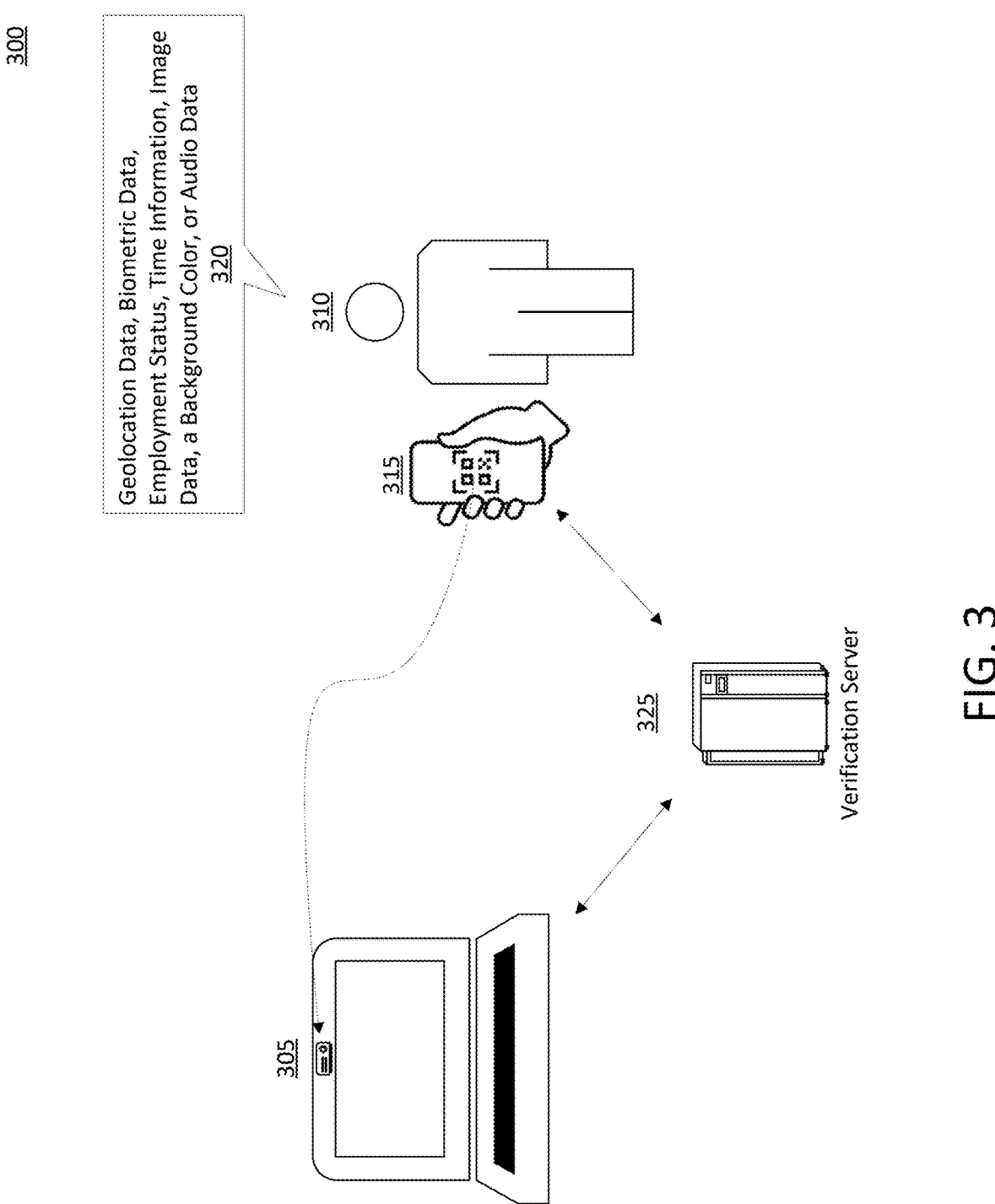
FIG. 3 depicts an illustrative system diagram of a use case scenario for verifying a user identity in a video conference according to one or more aspects of the disclosure.

FIG. 3 depicts an illustrative system diagram 300 of a use case scenario for verifying a user identity in a video conference according to one or more aspects of the disclosure. One or more non-transitory computer-readable media may store instructions that, when executed, cause the performance of one or more of the steps depicted in FIG. 3. The diagram shown in FIG. 3 is illustrative, and may be rearranged, omitted, and/or modified as desired. A computing device may comprise one or more processors and memory storing instructions that, when executed by the one or more processors, cause the performance of one or more of the steps depicted in FIG. 3. One or more non-transitory computer-readable media may store instructions that, when executed, cause the performance of one or more of the steps depicted in FIG. 3.

A verification server 325 (e.g., computing device) may receive data from a first device 305 (e.g., personal computer, laptop, tablet, room audio controller, etc.) and a mobile device 315 (e.g., smartphone) from a user 310 (e.g., video conference attendee, host, etc.). Examples of user data 320 may include geolocation data, biometric data, employment status, time information, image data, a background color, or audio data. User data 320 may also include personally identifiable data or information that may help determine the identity of the user 310. The verification server 325 may use the data to generate a security code (e.g., visually transmitted code, QR code, etc.) that is encoded with the requisite data. Alternatively, or additionally, the verification server may be temporally synched key tokens that may be converted into a visually transmitted code (e.g., QR Code). The verification server 325 may send the security code to the mobile device 315. When the security code is pointed in the direction of the camera of the first device 305, the security code may be detected and/or processed (e.g., decoded, decrypted, etc.) by the first device 305. Additionally, or alternatively, both the user and the host of the video conference may be verified and/or authenticated.

To provide an example of how the process depicted in FIG. 3 may operate from the perspective of a user (e.g., the user 310), a user might use their laptop (e.g., the first device 305) to join a video conferencing session. The user might log in to the video conferencing session using a username, password, two-factor authentication code, or the like. Then, when displaying video, the user may use a different device, such as their smartphone (e.g., the mobile device 315) to generate and display a QR code on the video stream. For instance, the user might hold up their smartphone to the laptop and allow the camera of the laptop to capture an image of the QR code. That QR code might comprise a wide variety of data that can further authenticate the user, such as geolocation data (e.g., confirming the location of the user during the conference), employment status data (e.g., confirming that the user is permitted to join the conference), and the like. The variety of data that might be required may vary depending on the sensitivity (e.g., confidentiality) of the video conference. For example, if the video conference is highly sensitive, more variety of the user's data may be required in order to access the video conference. In this manner, the QR code can be used to validate the user's video stream in addition to other forms of authentication, providing additional confidence that the video is real (and, e.g., not a deepfake, previous recording of the participant, or the like). In another instance, the user's video may periodically be validated throughout the duration of the video conference. This may be accomplished by generating new QR codes to be scanned at random points throughout the video conference.

In another example, the first device 305 may comprise a room audio controller to send and receive audio data. Room audio controllers may manage microphones and audio inputs within the meeting space. They may capture audio from users, ensuring clear and reliable transmission to remote users or recording devices. During the authentication process, these controllers may detect and analyze audio cues or signals that may be used to verify the presence and identity of authorized users. Audio controllers may encode specific signals or codes into the audio stream. These signals might be used to signify the start or confirmation of authentication protocols. Additionally, or alternatively, the device/s (e.g., user's smartphone, laptop, computing device, room audio controller, etc.) may emit and/or receive ultrasonic sounds that the video conference platform may receive and/or emit to ensure that the user who was initially validated, might still be the same user who is currently on the call. Users' responses or acknowledgments may be encoded back into the audio stream, which the room audio controller can decode and interpret as part of the authentication verification process. Room audio controllers can integrate with authentication systems or protocols used by the organization. This integration ensures that authentication procedures align with security policies and regulatory requirements. The verification server 325 or other authentication systems may also use the audio data received by the room audio controller to verify and authenticate the users. For example, the verification server 325 may require users to verbally confirm their identity or respond to specific prompts embedded in the audio stream managed by the room audio controller. During the authentication process, room audio controllers might facilitate real-time communication between the users (e.g., room (host) and users). They may ensure that audio signals, prompts, or responses are transmitted promptly and accurately. Any discrepancies or anomalies detected in the authentication process may be flagged or reported through the room audio controller, enabling immediate action or intervention as necessary.

FIG. 4 depicts a flow chart 400 of a method for verifying the identity of a user and determining the authenticity of the user video according to one or more aspects of the disclosure. The steps shown in FIG. 4 are illustrative, and may be re-arranged, omitted, and/or modified as desired. A computing device may comprise one or more processors and/or memory storing instructions that, when executed by the one or more processors, cause the performance of one or more of the steps depicted in FIG. 4. One or more non-transitory computer-readable media may store instructions that, when executed, cause the performance of one or more of the steps depicted in FIG. 4.

In step 405, the computing device may receive, from a first device 305 (e.g., personal computer, laptop, smart device, room audio controllers, etc.) and based on a confidentiality level of a video conference, a plurality of security parameters associated with accessing the video conference. Security parameters may refer to the specific measures or controls put in place to safeguard the confidentiality, integrity, and/or availability of the conference. Security parameters may also refer to the rules for a user to access the video conference, such as the requirements for the data that must be included in the security code.

The confidentiality level of the video conference may proportionately correspond to an amount (e.g., number) and/or intensity (e.g., type) of the plurality of security parameters that must be met in order for the user (e.g., an attendee, a participant, every attendee, every participant, some attendees, some participants, host, room host, etc.) to access the video conference. The confidentiality level of the video conference may be predetermined by a host of the video conference and may relate to the sensitivity of the information being discussed or shared during the video conference. For example, a host may indicate, prior to the start of the video conference, that the video conference requires a high level of security (e.g., a government and/or military briefing, healthcare discussions involving patient data, and/or legal proceedings with highly sensitive information, etc.). The computing device may determine (e.g., by using algorithms, machine learning models, etc.) the appropriate amount and/or type of security parameters (e.g., proof of employment position, proof of employment status, proof of top-secret clearance, restricted geographic regions for data storage and/or transmission, biometric authentication, hardware tokens etc.) proportionate with a high level of security.

In another example, the host may indicate, prior to the start of the video that the video conference requires a medium level of security (e.g., business meeting in a mid-sized company discussing proprietary information, financial updates, or strategic planning, etc.). The computing device may determine the appropriate number and/or type of security parameters (e.g., verified email accounts, proof of invitation, multi-factor authentication, biometric authentication, etc.) associated with a medium level of security.

In another example, the host may indicate, prior to the start of the video that the video conference requires a low level of security (e.g., a casual meeting among colleagues in a small startup company where discussions involve non-sensitive information like project updates, general brainstorming, or social team-building activities, etc.). The computing device may determine the appropriate number and/or type of security parameters (e.g., password, name, etc.) associated with a low level of security.

The computing device may receive a higher amount and/or intensity of security parameters for a high level of security, a lower amount and/or intensity of security parameters for a low level of security, or an average amount and/or intensity of security parameters for a low level of security. Additionally, or alternatively, the host may select the security parameters that must be met for the user to join the video conference call.

Additionally, or alternatively, the computing device may automatically assign (e.g., by a machine learning model, algorithms, etc.) the confidentiality level based on a default setting of the video conference. The security parameters may be proportionate to the confidentiality level of the video conference. Machine learning models or algorithms may continuously learn and/or adapt based on historical data, patterns, and/or contextual factors to assign appropriate confidentiality levels. Additionally, or alternatively, the confidentiality levels may be dynamically adjusted as the conference progresses or as new information about its content or participants becomes available. Automated assignment may save time and/or ensure consistency in applying security measures across various conference types. Proper assignment may help mitigate risks associated with data breaches, unauthorized access, or inadvertent exposure of sensitive information.

The first device 305 may be, but not limited to, any device that may be configured to execute the video conference application, such as a personal computer, laptop, room audio controllers, smart device, tablet, etc. The video conference application may be configured to use a camera of the first device 305 to scan and process the security code. Additionally, or alternatively, the first device 305 may be a device that may benefit from identity verification and/or authentication, such as an ATM machine that has a camera or a kiosk that has a camera.

In step 410, the computing device may generate, based on a plurality of security parameters, a security code that is encoded with user data. Additionally, or alternatively, the computing device may generate temporally synched key tokens that may be converted into a security code. This process may enhance security by creating a unique code that is tied to specific user information, thereby making it harder to replicate or guess. The security code may comprise, but not limited to, at least one of: a visually transmitted code, a one-dimensional bar code, or a two-dimensional bar code. The two-dimensional bar code may comprise, but not limited to, at least one of: Quick Response (QR) code, DotCode, PDF417, MaxiCode, Data Matrix Code, Frame QR Code, Secret Function Equipped QR Code (SQRC), rMQR Code, Micro QR Code, or a unique identifier (UID). The computing device may generate the security code by encoding it with relevant user data, such as user data that may meet the requirements of the security parameters.

User data may comprise generic user information, such as the user's first and last name or IP address. User data may also comprise, but not limited to, at least one of: geolocation data, biometric data, employment status, time information, image data, a background color, or audio data.

Geolocation data may include location-based information about where the user is accessing the service from. For example, teammates who reside and work in Washington D.C. may have been invited to attend the video conference with an expected geolocation data of Washington D.C. If the user's geolocation is in Russia, then the user may be rejected and/or blocked from attending the video conference. In another example, participants may be required to attend the video conference within their home. If the geolocation data indicates a location that does not match the user's home address or expected IP address, the user may not be permitted to access the video conference. The geolocation data may be determined by a variety of methods, such as by using Global Positioning System (GPS) receivers coupled to the user's laptop or mobile device. Other methods may include, cellular network triangulation using the user's mobile device and nearby cell towers, Wi-Fi positioning using the user's mobile device and nearby Wi-Fi networks, IP address geolocation using the IP address of the user's devices. Bluetooth beacons, Radio-Frequency identification, Sensor Fusion, Brower Geolocation may also be used to determine the user's geolocation data. The geolocation data may be encoded in the security code.

Biometric data may include unique physiological or behavioral characteristics (e.g., facial recognition, fingerprints, voice patterns, etc.). Biometric traits are unique to each individual, making them difficult to forge or replicate. Integrating biometric authentication with security codes (e.g., QR codes) may strengthen security measures against unauthorized access and potential breaches. For example, the user may be required to scan their fingerprint, retina, or face using a biometric scanner linked to their mobile device. The user's biometric data may be encoded into the QR code. Once the QR code is scanned, the biometric data may be compared against the expected biometric data of the user. Additionally, or alternatively, biometric data can be used to encrypt QR codes or the data they contain. The QR code may only be decipherable or accessible after successful biometric authentication, ensuring that only authorized users can view or use the information. Additionally, or alternatively, biometric data can be integrated as part of a multi-factor authentication process. Alongside scanning the QR code, users may verify their identity through an external biometric scan, adding an extra layer of security. Additionally, or alternatively, participants might be periodically prompted to re-authenticate themselves using biometrics to ensure continuous security.

Employment status may provide information related to the user's current job or employment situation. For example, the video conference may be highly sensitive and exclusively for employees with a top-secret clearance within X department. The employment status of the user would need to indicate that the user has a top-secret clearance within X department in order to have access to the video conference. In another example, if the video conference is for an all-hands meeting, then the employment status may only need to indicate that the user is an active employee within the company. The employment status of the user may be collected through the updated employee records provided by the company.

Time information may involve dynamically generating security codes (e.g., QR codes) that incorporate time-sensitive information, ensuring that each code is unique and valid only for a specific period. QR codes may be generated dynamically based on current time data. This may be achieved using algorithms that calculate a cryptographic hash or a unique identifier incorporating the current time-stamp. To maintain security, QR codes may be refreshed periodically, such as every minute or every few minutes. This periodic refresh may ensure that each QR code is only valid for a short duration, mitigating the risk of unauthorized access through intercepted or outdated QR codes. Both the QR code generation server and the authentication server may be synchronized with a reliable time source, such as Network Time Protocol (NTP), to ensure consistency in time-based authentication. For example, the video conference platform (e.g., interface, camera) may scan the user's QR code displayed on the user's mobile device. Upon scanning, the QR code's embedded time data may be compared with the current server time to verify its validity. Additionally, or alternatively, time information may indicate the current time zone that the user is in, which may contribute to the user's geolocation data. Additionally, or alternatively, the time information may indicate the time stamp of the user data to ensure it is the most accurate and up to date user data.

Image data may include visual data related to the user or the environment they are in. Background color may include visual elements that can be incorporated into the security code generation process. For example, the image data and/or background color may be encoded into the security code (e.g., QR code). When the QR code is scanned and/or processed, the image data and/or background color may be compared against the expected image data and/or background color associated with this user based on the security parameters selected for this video conference.

Audio data may include, but not limited to, audible or inaudible sound or voice-related information or ambient noise information. For example, the video conference may send out an ultrasonic sound at random (e.g., periodic) times throughout the duration of the video conference. These ultrasonic sounds may be received by the user's mobile device. The user may receive a new security code with this audio data encoded into the security code. Once scanned and/or processed, the audio data may be compared against the expected audio data. If the audio data and the expected audio data matches, then the user may be validated. In another example, the security code may reflect the audio (e.g., ambient noise) it captured from the user's mobile device from the meeting environment. Additionally, or alternatively, the audio data may be encoded into the QR code to prove that the mobile device can "hear" the video conference throughout the duration of the video conference. This audio might include sounds from other participants' devices, such as microphone pickup or ambient noise. Using machine learning algorithms, the captured audio may be processed in real-time. The computing device might extract features or patterns from the audio data that are unique to the current session or meeting. The processed audio data may then be encoded into a QR code format. This QR code may effectively be a representation of the collective audio signatures or characteristics from the meeting environment at that moment. For example, to join or authenticate within the meeting, the user may scan the QR code encoded with the audio data. The receiving device (e.g., video conference platform) may decode the QR code and extract the audio data embedded within. A matching algorithm may compare the extracted audio data with the ambient audio it is currently receiving. If there is a match or correlation within an acceptable threshold, authentication may be deemed successful, granting access to the meeting.

Additionally, or alternatively, user data may also comprise specific user information, such as personally identifiable information and/or sensitive information. The user may have opted in to provide the user data. Additionally, or alternatively, the user data may have been automatically collected by the computing device.

In step 415, the computing device may cause the mobile device 315 to display the security code for a predetermined time period. Additionally, or alternatively, the security code may be sent to the users at different points throughout the duration of the video conference. The security codes may be sent based on a schedule or at random points in time. The user may be required to scan these new security codes at within a predetermined time period before the security code expires. For example, if the user fails to scan the new security code within the predetermined time period, the user may be ejected from the video conference. These features may optimize security and/or usability by ensuring the security code is both easily detected or scanned by a camera of the first device 305 and/or protected from unauthorized access. The predetermined time period during which the security code is displayed may ensure it remains accessible for the intended use, such as entering it into an application or confirming a transaction. By limiting the display time, the likelihood of the code being intercepted or captured by unauthorized individuals may be reduced. This time constraint may minimize the window during which the code is vulnerable to exploitation. The brightness adjustment may optimize the readability of the code based on ambient light conditions, which may help facilitate accurate reading by cameras, further enhancing usability.

In step 420, the computing device may receive an indication that the first device 305 scanned the security code by using a camera of the first device 305, wherein the indication comprises the security code that is encoded with the user data. For example, the user may point the security code displayed on the mobile device 315, in the direction of the camera of the first device 305. When the security code is detected and/or scanned by, but not limited to, the video conference application, the computing device may receive the indication that the security code has been detected.

In step 425, the computing device may verify an identity of a user. To verify the identity of the user, the computing device may decode the security code. The decoded information may include various types of user data encoded within the security code as discussed in steps 410-420. The user data may range from basic identification information to more complex data points depending on the confidentiality level of the video conference and the security requirements and/or parameters associated with the video level of confidentiality. The computing device may use an algorithm to decode (e.g., process) the security code once scanned.

To verify the identity of the user, the computing device may then compare the decoded user data derived from the security code and/or the expected user data associated with the video conference. The expected user data may be, but not limited to, the predetermined set of user information that the computing device may expect to match with the decoded user data. For example, the video conference may be highly sensitive and exclusively for employees with a top-secret clearance within X department. The security code may be encoded with the basic identification information, such as the user's name, company name, and employee identification number, in addition to more complex data points, such as the user's clearance level (e.g., top-secret clearance, secret clearance, etc.), employment status, and/or the department within the company in order to have access to the video conference. Once the video conference platform of the first device 305 scans the security code, the computing device may determine whether the decoded user data matches the expected data. If the match is successful, then the user may be verified. If the user data fails to match the expected user data, then the user may not be verified. In another example, if the video conference is for an all-hands meeting with a low level of confidentiality, then the user data may only include basic identification information, such as the user's name, company name, and employee identification number. If the user data matches the expected user data, then the user may be verified and given access to the video conference. If the user data fails to match the expected user data, then the user may not be verified.

The computing device may then determine, based on the decoded user data and/or the plurality of security parameters, an authenticity of a user video. The authenticity of a user video may be determined using various methods, such as source verification, deepfake detection, metadata examination, digital forensics, etc. Source verification may involve verifying the origin of the user's video and determining whether the video has been altered or manipulated (e.g., by artificial intelligence (AI), hacker, etc.). Deepfake detection may involve using AI-based tools and algorithms designed to detect deepfakes and AI-generated videos. These tools may analyze facial landmarks, audio inconsistencies, and other patterns associated with manipulated videos. The video's metadata (date, time, location) may be used to verify its authenticity against the expected meta of the user's video. Digital forensics may use specialized tools to analyze the video file for signs of manipulation, such as discrepancies in file properties or compression artifacts.

Verifying the user identity or authenticating the user video may further comprise an audio pairing between the first device 305 and the mobile device 315. The audio pairing may temporally be activated at randomly generated frequencies or at predetermined frequencies based on the confidentiality level of the video conference. For example, if the confidentiality level of the video conference is high, then the frequency of the audio pairing may be at a higher frequency than it would be for a medium or level confidentiality level. The audio pairing may include sonic audio pairing which may utilize sound waves emitted by one device (e.g., a smartphone or computer) to establish a secure connection with another device (e.g., a speaker or another smartphone). These sound waves may be inaudible frequencies (e.g., ultrasonic) or specific patterns of audible frequencies that are unique and/or difficult to replicate. Devices may use sonic signals to verify each other's identity before establishing a connection. This process may prevent unauthorized devices from accessing sensitive information or resources. Devices may exchange cryptographic keys or tokens embedded in the sonic signals to pair securely. This may ensure that data exchanged between them may remain confidential and/or secure.

Additionally, or alternatively, a relative background of the video conference may be encoded with anti-piracy video streaming data. By embedding anti-piracy measures into the video stream, the relative background (which may include sensitive or proprietary information) may be protected against unauthorized recording or screen capturing. Anti-piracy encoding may include, but not limited to, watermarking, digital fingerprinting, or encryption techniques that make it difficult for unauthorized viewers to capture or redistribute the video content. Digital signatures or hashes may be embedded within the video stream and may be used to verify the authenticity of the content and/or detect any unauthorized modifications.

Additionally, or alternatively, an out-of-band channel may accompany the video stream and provide an extra layer of security and verification (e.g., authentication, validation, identification, etc.). This out-of-band channel can carry encoded signals that authenticates the user (e.g., host and/or participants in the video stream). For example, an encoded audio data stream (e.g., at the Nyquist frequency below the maximum frequency with a connection) may transmit a low bandwidth code verifying the identity of the user. To further verify the authenticity of the user, the out-of-band coded signals may be used as a basis to ensure the correct response code is returned. The out-of-band coded signals may be sent and/or received through a device (e.g., mobile device, smartphone, room audio controller, etc.), which may also be used to encode and/or decode the out-of-band coded signal.

The medium of the out-of-band signal may be sound and/or visual. For example, an audio signal may be encoded with a low-bandwidth code, such as specific tones or frequencies, embedded within the audio stream accompanying the video. The audio signal may be decoded to identify the user. The correct response code may be generated based on the decoded signal, verifying the authenticity of the users. In another example, a visual based out-of-band signal might be specific colored dots or patterns encoded in a particular region of the video screen. The visual signals may be captured and decoded to extract the encoded information. Similar to audio signals, the decoded visual code may verify the authenticity of the users by generating the correct response code.

By using out-of-band signals, authentication may not be solely reliant on the primary video stream, making it more resistant to spoofing or manipulation attempts. Both audio and visual signals may operate at low bandwidths, minimizing the impact on the primary video transmission while still providing robust authentication.

In step 430, the computing device may allow based on the verifying the identity of the user, access to the video conference. A successful verification of the user's identity may indicate that the decoded user data is consistent with the expected user data. Additionally, or alternatively, the user may be rejected from accessing the video conference, based on a determination that the identity of a user is not verified. The computing device may indicate an unsuccessful verification of the user's identity and subsequently reject the user from accessing a video conference for a variety of reasons.

For example, if the user enters an incorrect or expired security code, the decoding process may yield mismatched or invalid user data. This discrepancy will fail the comparison with expected user data, leading to rejection. In another example, the decoded user data may not match the expected user data associated with the video conference. This may occur due to outdated information, discrepancies in personal details, or changes that have not been updated in the system.

The user's environment or context (such as IP address, geolocation, or time of access) may not align with the predetermined security parameters set by the system. For example, accessing from an unauthorized location or at an unusual time may trigger rejection. Technical problems during the authentication process, such as network connectivity issues, server errors, or compatibility issues between the user's device and/or the conference platform, may also prevent successful verification. Suspected or detected attempts of unauthorized access, such as using invalid credentials, manipulating the security code, or attempting to spoof the authentication system, may also lead to immediate rejection. The video conference platform or organization may have specific policies or restrictions in place that prevent certain users or devices from accessing conferences. This may be due to security policies, membership status, or administrative settings. For example, the administrative setting may require all users to verify their account with a valid email address. If a user is attempting to access the video conference without a verified account, then the user may be blocked from even receiving security code. Concerns related to user privacy, data protection regulations, or compliance requirements may lead to rejection if the user's data handling practices do not meet the necessary standards or permissions. Detection of security breaches, suspicious activity patterns, or anomalies in user behavior may trigger proactive security measures, including rejection from accessing the conference to safeguard against potential threats.

FIG. 5 depicts an activity diagram 500 according to one or more aspects of the disclosure. The steps shown in FIG. 5 are illustrative, and may be re-arranged, omitted, and/or modified as desired. A computing device may comprise one or more processors and/or memory storing instructions that, when executed by the one or more processors, cause the performance of one or more of the steps depicted in FIG. 5. One or more non-transitory computer-readable media may store instructions that, when executed, cause the performance of one or more of the steps depicted in FIG. 5.

The activity diagram 500 illustrates the first device 305, the verification server 325, and/or the mobile device 315. The video conference application (e.g., platform software, etc.) may be executed on the first device 305. At 505, the video conference application may send the security parameters, based on the confidentiality level of video conference, to the verification server 325. The user 310 may use the mobile device 315 to send user data at 510. The user 310 may be prompted to send the data or the data may be sent automatically. Additionally, or alternatively, the user 310 may also log into a user interface (e.g., an app) associated with the video conference to initiate the process of verification. After the verification server 325 has received the necessary data from both the user 310 and/or the video conference, the verification server 325 may generate a security code that is encoded with user data at 515. At 515, the verification server 325 may send the security code to be displayed on the mobile device 315. The security code may be displayed on the mobile device 315 for a predetermined time period. At 520, the user 310 may point the mobile device 315 in the direction of the first device 305 and/or display the security code for the first device 305 to detect and/or scan. At 525, the first device 305 may send, to the verification server, an indication that it scanned the security code. The first device 305 may have scanned the security code by using the camera associated with the video conferencing software. At 530, the verification server 325 may verify the identity of the user 310 by decoding the security code and/or determining the authenticity of the user video. At 535, the verification server 325 may allow access the user to have access to the video conference. At 540, the user 310 may access the video conference through the first device 305.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and/or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and/or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and/or the like. Particular data structures may be used to more effectively implement one or more aspects discussed herein, and/or such data structures are contemplated within the scope of computer executable instructions and/or computer-usable data described herein. Various aspects discussed herein may be embodied as a method, a computing device, a system, and/or a computer program product.

Although the present invention has been described in certain specific aspects, many additional modifications and/or variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and/or spirit of the present invention. Thus, embodiments of the present invention should be considered in all respects as illustrative and/or not restrictive. Accordingly, the scope of the invention should be determined not by the embodiments illustrated, but by the appended claims and/or their equivalents.

What is claimed is:

1. A method comprising:
   receiving, by a computing device, from a first device, and based on a confidentiality level of a video conference, a plurality of security parameters associated with accessing the video conference;
   receiving, by a computing device and from a mobile device, user data;
   generating, by the computing device and based on the plurality of security parameters, a security code that is encoded with user data;
   causing, by the computing device, the mobile device to display the security code for a predetermined time period;
   receiving, by the computing device, an indication that the first device scanned the security code by using a camera of the first device, wherein the indication comprises the security code that is encoded with the user data;
   verifying, by the computing device, an identity of a user by:
   decoding the security code;
   comparing decoded user data of the decoded security code and expected user data associated with the video conference; and
   determining, based on the decoded user data and the plurality of security parameters, an authenticity of a user video; and allowing, by the computing device and based on the verifying the identity of the user, access to the video conference.

2. The method of claim 1, wherein the user data comprises:

at least one of:
    geolocation data,
    biometric data,
    employment status,
    time information,
    image data,
    a background color, or
    audio data.

3. The method of claim 1, wherein causing display of the security code further comprises:

an automatic adjustment of display brightness; and
wherein the security code comprises at least one of:
    a visually transmitted code,
    a one-dimensional bar code, or
    a two-dimensional bar code comprising at least one of:
        a Quick Response (QR) code,
        DotCode, PDF417,
        MaxiCode,
        Data Matrix Code,
        Frame QR Code,
        Secret Function Equipped QR Code (SQRC),
        rMQR Code,
        Micro QR Code, or
        a unique identifier (UID).

4. The method of claim 1, wherein the first device is configured to execute a video conference application, wherein the video conference application is configured to use the camera to scan and process the security code.

5. The method of claim 1, wherein the confidentiality level of the video conference proportionately corresponds to an amount of the plurality of security parameters that must be met in order for the user to access the video conference and is predetermined by a host of the video conference.

6. The method of claim 1, wherein the verifying further comprises an audio pairing between the first device and the mobile device, wherein the audio pairing is temporally activated at:

randomly generated frequencies; or
predetermined frequencies based on the confidentiality level of the video conference.

7. The method of claim 1, further comprises encoding, by the computing device, a relative background of the video conference with anti-piracy video streaming data.

8. The method of claim 1, wherein the first device comprises:

an ATM machine comprising the camera; or
a Kiosk comprising the camera.

9. The method of claim 1, further comprises:

rejecting, based on a determination that the identity of a user is not verified, access to the video conference.

10. A computing device comprising:

one or more processors; and
memory storing instructions that, when executed by the one or more processors, cause the computing device to:
    receive, from a first device, and based on a confidentiality level of a video conference, a plurality of security parameters associated with accessing the video conference;
    receive, from a mobile device, user data;
    generate, based on the plurality of security parameters, a security code that is encoded with user data;

cause, the mobile device to display the security code for a predetermined time period;
receive, an indication that the first device scanned the security code by using a camera of the first device, wherein the indication comprises the security code that is encoded with the user data;
verify an identity of a user by:
    decoding the security code;
    comparing decoded user data of the decoded security code and expected user data associated with the video conference; and
    determining, based on the decoded user data and the plurality of security parameters, an authenticity of a user video; and
allow, based on a verified identity of the user, access to the video conference.

11. The computing device of claim 10, wherein the user data comprises at least one of:

geolocation data,
biometric data,
employment status,
time information,
image data,
a background color, or
audio data.

12. The computing device of claim 10, wherein the instructions, when executed by the one or more processors, cause the computing device to further cause display of the security code comprising:

an automatic adjustment of display brightness; and
wherein the security code comprises at least one of:
    a visually transmitted code,
    a one-dimensional bar code, or
    a two-dimensional bar code comprising at least one of:
        a Quick Response (QR) code,
        DotCode, PDF417,
        MaxiCode,
        Data Matrix Code,
        Frame QR Code,
        Secret Function Equipped QR Code (SQRC),
        rMQR Code,
        Micro QR Code, or
        a unique identifier (UID).

13. The computing device of claim 10, wherein the first device is configured to execute a video conference application, wherein the video conference application is configured to use the camera to scan and process the security code.

14. The computing device of claim 10, wherein the confidentiality level of the video conference proportionately corresponds to an amount of the plurality of security parameters that must be met in order for the user to access the video conference and is predetermined by a host of the video conference.

15. The computing device of claim 10, wherein the instructions, when executed by the one or more processors, cause the computing device to further verify comprising an audio pairing between the first device and the mobile device, wherein the audio pairing is temporally activated at:

randomly generated frequencies; or
predetermined frequencies based on the confidentiality level of the video conference.

16. One or more non-transitory computer-readable media storing instructions, wherein the instructions, when executed by one or more processors of a computing device, cause the computing device to:

receive, from a first device, and based on a confidentiality level of a video conference, a plurality of security parameters associated with accessing the video conference;

receive, from a mobile device, user data;

generate, based on the plurality of security parameters, a security code that is encoded with user data;

cause, the mobile device to display the security code for a predetermined time period;

receive, an indication that the first device scanned the security code by using a camera of the first device, wherein the indication comprises the security code that is encoded with the user data;

verify an identity of a user by:

decoding the security code;

comparing decoded user data of the decoded security code and expected user data associated with the video conference; and determining, based on the decoded user data and the plurality of security parameters, an authenticity of a user video; and allow, based on a verified identity of the user, access to the video conference.

17. The one or more non-transitory computer-readable media of claim 16, wherein the instructions, when executed by the one or more processors, cause the computing device to:

encode a relative background of the video conference with anti-piracy video streaming data.

18. The one or more non-transitory computer-readable media of claim 16, wherein the instructions, when executed by the one or more processors, cause the computing device to:

reject, based on a determination that the identity of a user is not verified, access to the video conference.

19. The one or more non-transitory computer-readable media of claim 16, wherein the first device comprises:

an ATM machine comprising the camera; or a Kiosk comprising the camera.

20. The one or more non-transitory computer-readable media of claim 16, wherein the instructions, when executed by the one or more processors, cause the computing device to further cause display of the security code comprising:

an automatic adjustment of display brightness; and wherein the security code comprises at least one of:

a visually transmitted code, a one-dimensional bar code, or a two-dimensional bar code comprising at least one of:

a Quick Response (QR) code,

DotCode, PDF417,

MaxiCode,

Data Matrix Code,

Frame QR Code,

Secret Function Equipped QR Code (SQRC), rMQR Code,

Micro QR Code, or a unique identifier (UID).

* * * * *